UNITED STATES PATENT OFFICE.

RUSSELL S. PENNIMAN AND JOHN C. SCHRADER, OF DOVER, NEW JERSEY, ASSIGNORS TO THE ATLANTIC DYNAMITE COMPANY OF NEW JERSEY, OF KENVIL, NEW JERSEY.

RESINOUS DOPE AND METHOD OF MAKING SAME.

SPECIFICATION forming part of Letters Patent No. 647,606, dated April 17, 1900.

Application filed May 16, 1892. Serial No. 433,187. (No specimens.)

*To all whom it may concern:*

Be it known that we, RUSSELL S. PENNIMAN and JOHN C. SCHRADER, of Dover, in the county of Morris and State of New Jersey, have invented certain new and useful improvements in resinous dope ingredients for use as or in place of the carbon ingredients in high-explosive compounds and a novel method of producing the same; and we do hereby declare that the following specification is a clear, true, and complete description of our invention.

Our improved dope ingredient may be termed "sulpho-resinous," in that it contains both sulphur and resinous matter, (preferably common rosin or colophony;) and with a view to indicating the status of our invention as to novelty we will first state that in the manufacture of dope for use in explosive compounds containing nitroglycerin and suitable nitrates resinous matter has been heretofore employed as an ingredient in various forms—i. e., it has been simply powdered and mixed with other ingredients, these latter in some cases including powdered sulphur. In some instances said mixtures have been heated in mass, so as to soften the sulphur and the resinous matter for causing both to operate adhesively with respect of the main portion of the mass—for instance, as in forming a non-absorbent grained dope—and in some cases the sulphur and the rosin have been first melted together preparatory to the reception in the melted mass of the other dry ingredients of the dope. In other cases rosin has been used as a mere cement, varnish, or coating for non-absorbent grains of dope. Rosin has also been employed with nitric acid in forming a chemical body, as in picrates, and rosin in its natural but pulverized condition has been mixed with double picrates. Rosin has also been used in forming resinates of calcium and of magnesium, and, still further, when liquefied it has been combined with nitroglycerin. Sulphur has also been widely used without rosin, but with various other ingredients. In none of these prior compounds containing rosin or sulphur and rosin has the latter been capable of resisting the softening or liquefying influences of nitroglycerin. If rosin be pulverized and then mixed with a small percentage of nitroglycerin, the rosin soon loses its pulverulent character and hardens into a solid mass. So, also, if rosin with sulphur pulverized separately or in their normal condition pulverized together be mixed with a small percentage of nitroglycerin the rosin will be promptly softened and the mass will thereafter become hardened or solidified. If rosin and sulphur be melted together, as heretofore, and then mixed with other dry ingredients, such as coal-carbon and nitrates, for forming a dope, the softening action of the nitroglycerin upon the rosin is not prevented, and although the rosin is present in such compounds only in very small proportions the compounds are nevertheless liable to harden and solidify as a sequence to said softening action.

In no instance known to us prior to our invention has a nitroglycerin dope contained a substitute for carbon in grains or particles composed wholly of rosin and sulphur homogeneously combined, and the production of such a dope is one object of our invention. We accomplish this by first melting the rosin and sulphur together and well mixing the same, and then after allowing it to harden by cooling we pulverize it, thus forming a dry-dope ingredient which will, with such other ingredients as may be employed therewith, take up and carry desirable percentages of nitroglycerin, and this novel sulpho-resinous matter can and does successfully resist the softening action of the nitroglycerin, and especially if the rosin and sulphur have been thoroughly treated. In other words, while good and valuable results will accrue by proceeding as described the best results can only be secured by subjecting the rosin and sulphur, mixed in suitable proportions, to a high temperature for a considerable length of time. The proportions of the rosin and sulphur may be varied; but if more than one part of sulphur to two parts of rosin be used such excess of sulphur will not be advantageous, the proportions stated being ample not only for so changing the character of the rosin as to enable it to resist the softening action of the liquid explosive, but also for securing desirable combustion when fired with a suitable nitrate, affording an abundance of oxygen, as is important in explosive compounds. This changing of the character of the rosin may be fairly termed "vulcanization," and in producing the "vulcanized" rosin I proceed as follows: One hundred (100) pounds of common rosin and fifty (50) pounds of ordinary sulphur are melted together in a steam-jacketed kettle and raised to a temperature far above the melting-point of sulphur (this latter being about 239° Fahrenheit) and preferably to that temperature afforded by steam at about one hundred pounds pressure to the square inch—say 320° Fahrenheit—and so maintained during certain foaming tendencies, (this varying as to time,) the mass being meanwhile agitated or stirred. When the foaming slackens or ceases, the liquid mass is run off into cooling vessels and allowed to harden. The hardened lumpy product is then broken up and pulverized, preferably by the use of a revolving barrel containing balls of iron or stone. This powdered vulcanized resinous product is then ready for use, and it can be kept indefinitely without losing its pulverulent character under such variations in temperatures as would be liable to occur during storage and transportation.

It is to be understood that we believe that rosin and sulphur have never before been combined by melting, then hardened by cooling, and then ground or pulverized to form a dope ingredient, and that in all cases heretofore whenever rosin and sulphur have been melted together it was not with a view to nor did it result in changing the character of the rosin, as by vulcanization, said melting operations being merely for the purpose of and resulting in making those ingredients capable of operating adhesively, while in a melted or softened condition, in uniting such other dry fine matters as are or may be successfully employed in dopes.

Our novel sulpho-resinous dope ingredient is employed by us in various compounds with nitroglycerin, and some of these will be disclosed and made the subjects of separate contemporaneous applications for Letters Patent. (See Serial No. 433,188.)

While the prime object of our invention is to render the rosin incapable of being adversely affected by nitroglycerin, it is to be understood that our vulcanized rosin in a suitable comminuted or finely-divided condition may be profitably employed as a dope ingredient in explosive compounds which contain other liquid explosives, and also as a valuable ingredient in compounds of the "black-powder" types for use in all connections wherein slow combustion and high gas-producing capacities are desirable. The vulcanized rosin has also been used by us with quite satisfactory results in the forming of coarse-grained composite porous or cellular dope, suitable for use in free-running low-grade powders, by proceeding in accordance with the invention of John C. Schrader, disclosed in his Letters Patent No. 450,591, dated April 14, 1891. In this use of vulcanized rosin the proportion of sulphur therein is so great and the rosin so hardened and its character so changed that it operates after the manner of pure sulphur in the production of the said porous or cellular-grained dope.

Having thus described our invention, we claim as new and desire to secure by Letters Patent—

1. The method of making a resinous dope ingredient, for use in explosive compounds, substantially as hereinbefore described, by mixing rosin and sulphur, then highly heating the mass for vulcanizing the rosin, then cooling the mass until it has hardened, and then breaking up and pulverizing the hardened mass.

2. The method of vulcanizing rosin for use in explosive compounds, which consists in mixing rosin and sulphur; then subjecting the mass to a high temperature during the incident foaming of the mass, and until said foaming subsides, then cooling it down to a hardened mass.

3. The vulcanized rosin substantially as hereinbefore described, adapted for use in explosive-compound dopes, as a separate and complete ingredient of combined carbon and sulphur.

RUSSELL S. PENNIMAN.
JOHN C. SCHRADER.

Witnesses:
CLAUS J. ANDERSON,
SYDNEY T. SMITH.